(12) United States Patent
Pelosi et al.

(10) Patent No.: US 7,029,618 B2
(45) Date of Patent: Apr. 18, 2006

(54) ACETOACETYLATED POLYVINYL POLYMERS

(75) Inventors: Lorenzo Fred Pelosi, Wilmington, DE (US); Patricia Mary Ellen Sormani, Newark, DE (US)

(73) Assignee: E.I. duPont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/072,930

(22) Filed: Mar. 4, 2005

(65) Prior Publication Data

US 2005/0171293 A1 Aug. 4, 2005

Related U.S. Application Data

(62) Division of application No. 10/775,571, filed on Feb. 9, 2004, now Pat. No. 6,919,416.

(60) Provisional application No. 60/462,236, filed on Apr. 11, 2003.

(51) Int. Cl.
*C08J 5/00* (2006.01)

(52) U.S. Cl. ............ 264/331.21; 264/330; 264/331.11; 264/331.12; 264/331.15; 264/333; 526/266; 526/292.7; 526/309; 526/317.1; 526/318.2; 526/318.4; 526/320; 526/328.5; 526/330; 526/333

(58) Field of Classification Search .............. 264/330, 264/331.11, 331.12, 331.15, 331.21, 333; 526/266, 292.7, 309, 317.1, 318.2, 318.4, 526/320, 328.5, 329.6, 330, 333
See application file for complete search history.

(56) References Cited

U.S. PATENT DOCUMENTS

| | | |
|---|---|---|
| 2,413,823 A | 1/1947 | Gits et al. |
| 2,999,788 A | 9/1961 | Morgan |
| 3,018,091 A | 1/1962 | Doggins |
| 3,767,756 A | 10/1973 | Blades |
| 3,869,429 A | 3/1975 | Blades |
| 3,869,430 A | 3/1975 | Blades |
| 3,946,441 A | 3/1976 | Johnson |
| 4,147,702 A | 4/1979 | Chrutchfield et al. |
| 4,296,226 A | 10/1981 | Braun et al. |
| 4,466,138 A | 8/1984 | Gessalin |
| 4,687,809 A | 8/1987 | Kamikaseda et al. |
| 5,017,649 A | 5/1991 | Clemens |
| 5,026,456 A | 6/1991 | Hesler et al. |
| 5,028,372 A | 7/1991 | Brierre et al. |
| 5,209,877 A | 5/1993 | Frances et al. |
| 5,474,842 A | 12/1995 | Hoiness |
| 5,977,021 A | 11/1999 | Aoyama et al. |
| 6,451,930 B1 | 9/2002 | Burgman et al. |
| 6,815,021 B1 | 11/2004 | Ishikawa et al. |

FOREIGN PATENT DOCUMENTS

GB 1097646 1/1968

OTHER PUBLICATIONS

Del Reactor, F.; Blount, W. W.; and Leonard, D. R. Applications for Acetoacetyl Chemistry in Thermoset Coatings. J. Coat Tech 61, (771) 31 (89).

Synthesis of Acetoacetylated Resins and Applications for Acetoacetate Chemistry in Thermoset Coatings, F. Del Rector and J. S. Witzeman, Surface Coatings Autralia 25 (6) 1989.

*Primary Examiner*—Helen L. Pezzuto
(74) *Attorney, Agent, or Firm*—Sudhir G. Deshmukh

(57) ABSTRACT

The present invention relates compositions containing acetoacetylated polyvinyl polymers obtained from polyvinyl polymers, such as polyvinyl butyrals. These coating compositions are especially suitable for use as wash primers in automotive OEM and refinish coating applications.

2 Claims, No Drawings

ACETOACETYLATED POLYVINYL POLYMERS

CROSS REFERENCE TO RELATED APPLICATION

This application is a divisional of application Ser. No. 10/775,571, filed Feb. 9, 2004, now U.S. Pat. No. 6,919,416, which claims benefit to 60/462,236 filed Apr. 11, 2003.

FIELD OF INVENTION

The present invention generally relates to polyvinyl polymers and their various uses, such as coating compositions and molded products.

BACKGROUND OF THE INVENTION

Polyvinyl polymers, such as polyvinyl butyrals have been used since the 1930s in various compositions, such as lacquers, primers for metals and anti-corrosive paints, printing inks, temporary binders, adhesives and as films for shatterproof safety glass. The need still exists for polyvinyl polymer-containing compositions having improved coating properties, such as adhesion to metal substrates, improved corrosion resistance, and lower solution viscosity.

STATEMENT OF THE INVENTION

The present invention is directed to a composition comprising:

(a) an acetoacetylated polyvinyl polymer having the formula:

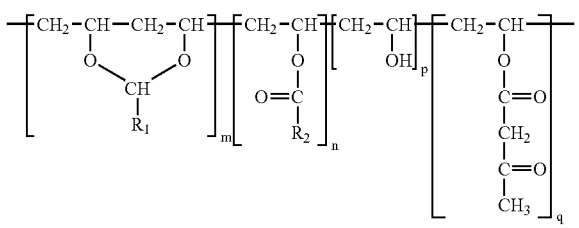

wherein (m) ranges from about 1.5 mole percent to about 85 mole percent, (n) ranges from about 0 mole percent to about 20.5 mole percent, (p) ranges from about 12 mole percent to about 87 mole percent and (q) ranges from about 1 mole percent to about 88 mole percent, sum of (m), (n), (p) and (q) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, said substituents being independently selected from the group consisting of $C_1$ to $C_{12}$ alkoxy, acyl, carboxyl, derivative of carboxyl, sulfonyl, derivative of sulfonyl, cyano, and halo;

(b) an acetoacetylated polyvinyl polymer having the formula:

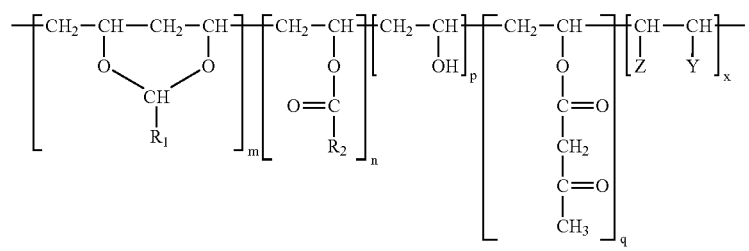

wherein (m) ranges from about 1.5 mole percent to about 85 mole percent, (n) ranges from about 0 mole percent to about 20.5 mole percent, (p) ranges from about 12 mole percent to about 87 mole percent, (q) ranges from about 1 mole percent to about 88 mole percent and (x) ranges from about 0.5 to about 6 mole percent, sum of (m), (n), (p), (q) and (x) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, and wherein Z is H, or —COOH and Y is —COOH, halo, unsubstituted phenyl or a combination thereof; said substituents being independently selected from the group consisting of $C_1$ to $C_{12}$ alkoxy, acyl, carboxyl, derivative of carboxyl, sulfonyl, derivative of sulfonyl, cyano, and halo; or (c) a combination thereof.

The present invention is also directed to a method of producing a coating on a substrate comprising:

(i) applying a layer over a substrate surface of a coating composition comprising:

(a) an acetoacetylated polyvinyl polymer having the formula:

(b)

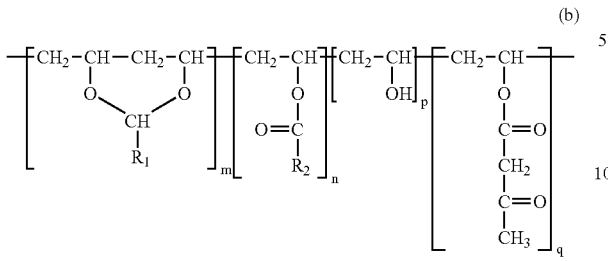

wherein (m) ranges from about 1.5 mole percent to about 85 mole percent, (n) ranges from about 0 mole percent to about 20.5 mole percent, (p) ranges from about 12 mole percent to about 87 mole percent and (q) ranges from about 1 mole percent to about 88 mole percent, sum of (m), (n), (p) and (q) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, said substituents being independently selected from the group consisting of $C_1$ to $C_{12}$ alkoxy, acyl, carboxyl, derivative of carboxyl, sulfonyl, derivative of sulfonyl, cyano, and halo;

(b) an acetoacetylated polyvinyl polymer having the formula:

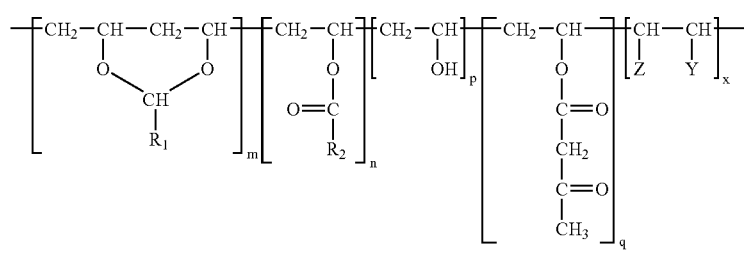

wherein (m) ranges from about 1.5 mole percent to 85 mole percent, (n) ranges from about 0 mole percent to 20.5 mole percent, (p) ranges from about 12 mole percent to about 87 mole percent, (q) ranges from about 1 mole percent to about 88 mole percent and (x) ranges from 0.5 to 6 mole percent, sum of (m), (n), (p), (q) and (x) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, and wherein Z is H, or —COOH and Y is —COOH, halo, unsubstituted phenyl or a combination thereof; said substituents being independently selected from the group consisting of $C_1$ to $C_{12}$ alkoxy, acyl, carboxyl, derivative of carboxyl, sulfonyl, derivative of sulfonyl, cyano, and halo; or (c) a combination thereof; and (ii) drying said layer under ambient conditions or at elevated cure temperatures to form said coating on said substrate.

The present invention is further directed to a method of producing a multi-coat system on a substrate comprising:

(i) applying a layer over a substrate surface of a coating composition comprising:

(a) an acetoacetylated polyvinyl polymer having the formula:

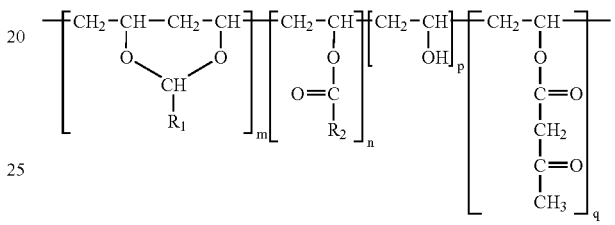

wherein (m) ranges from about 1.5 mole percent to about 85 mole percent, (n) ranges from about 0 mole percent to about 20.5 mole percent, (p) ranges from about 12 mole percent to about 87 mole percent and (q) ranges from about 1 mole percent to about 88 mole percent, sum of (m), (n), (p) and (q) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, said substituents being independently selected from the group consisting of $C_1$ to $C_{12}$ alkoxy, acyl, carboxyl, derivative of carboxyl, sulfonyl, derivative of sulfonyl, cyano, and halo;

(b) an acetoacetylated polyvinyl polymer having the formula:

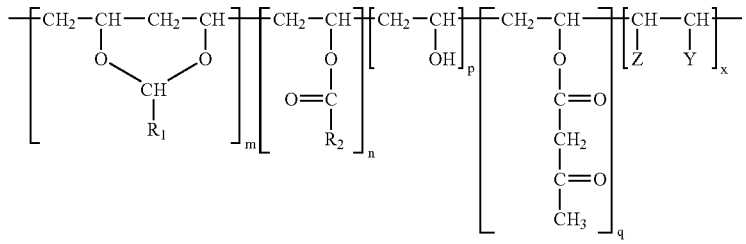

wherein (m) ranges from about 1.5 mole percent to 85 mole percent, (n) ranges from about 0 mole percent to 20.5 mole percent, (p) ranges from about 12 mole percent to about 87 mole percent, (q) ranges from about 1 mole percent to about 88 mole percent and (x) ranges from 0.5 to 6 mole percent, sum of (m), (n), (p), (q) and (x) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, and wherein Z is H, or —COOH and Y is —COOH, halo, unsubstituted phenyl or a combination thereof; said substituents being independently selected from the group consisting of $C_1$ to $C_{12}$ alkoxy, acyl, carboxyl, derivative of carboxyl, sulfonyl, derivative of sulfonyl, cyano, and halo; or (c) a combination thereof;

(ii) applying a layer of a base coating composition on said composition layer;

(iii) applying a layer of a clear coating composition on said layer of base coating composition to form a multi-layer system on said substrate; and (iv) drying said multi-layer system under ambient conditions or at elevated cure temperatures to form said multi-coat system on said substrate.

The present invention is also directed to a method of producing a molded article, such as a safety helmet, said method comprising:

(i) mixing fibrids, floc, pulp, micropulp or a combination thereof with a composition to form a moldable component, said composition comprising:

(a) an acetoacetylated polyvinyl polymer having the formula:

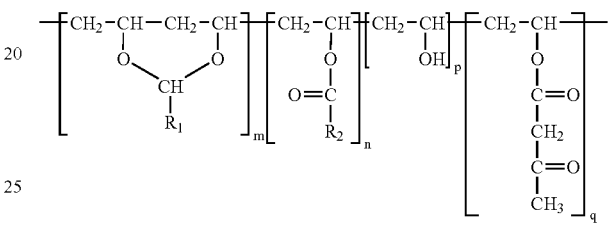

wherein (m) ranges from about 1.5 mole percent to about 85 mole percent, (n) ranges from about 0 mole percent to about 20.5 mole percent, (p) ranges from about 12 mole percent to about 87 mole percent and (q) ranges from about 1 mole percent to about 88 mole percent, sum of (m), (n), (p) and (q) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, said substituents being independently selected from the group consisting of $C_1$ to $C_{12}$ alkoxy, acyl, carboxyl, derivative of carboxyl, sulfonyl, derivative of sulfonyl, cyano, and halo;

(b) an acetoacetylated polyvinyl polymer having the formula:

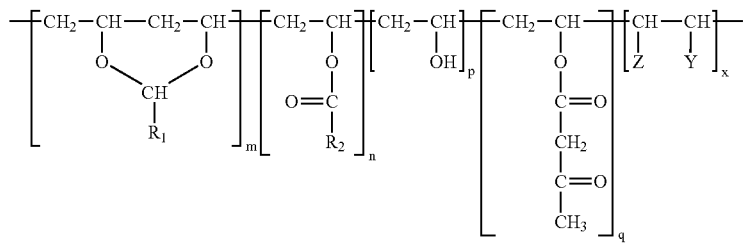

wherein (m) ranges from about 1.5 mole percent to 85 mole percent, (n) ranges from about 0 mole percent to 20.5 mole percent, (p) ranges from about 12 mole percent to about 87 mole percent, (q) ranges from about 1 mole percent to about 88 mole percent and (x) ranges from 0.5 to 6 mole percent, sum of (m), (n), (p), (q) and (x) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, and wherein Z is H, or —COOH and Y is —COOH, halo, unsubstituted phenyl or a combination thereof; said substituents being independently selected from the group consisting of $C_1$ to $C_{12}$ alkoxy, acyl, carboxyl, derivative of carboxyl, sulfonyl, derivative of sulfonyl, cyano, and halo; or (c) a combination thereof;

(ii) heating said moldable component into a melt;

(iii) conveying a desired amount of said melt into a cavity of an article mold;

(iv) cooling said desired amount of melt to form said article; and (v) removing said article from said cavity.

DETAILED DESCRIPTION OF THE PREFERRED EMBODIMENT

As used herein:

"Low VOC coating composition" means a coating composition that includes in the range of from 0.1 kilograms (1.0 pounds per gallon) to 0.72 kilograms (6.0 pounds per gallon), preferably from 0.3 kilograms (2.6 pounds per gallon) to 0.6 kilograms (5.0 pounds per gallon) and more preferably from 0.34 kilograms (2.8 pounds per gallon) to 0.53 kilograms (4.4 pounds per gallon) of the solvent per liter of the coating composition. All VOC's determined under the procedure provided in ASTM D3960.

"High solids composition" means a coating composition having solid component of above 30 percent, preferably in the range of from 35 to 90 percent and more preferably in the range of from 40 to 80 percent, all in weight percentages based on the total weight of the composition.

"GPC weight average molecular weight" means a weight average molecular weight measured by utilizing gel permeation chromatography, such as high performance liquid chromatograph (HPLC) supplied by Hewlett-Packard, Palo Alto, Calif. Unless stated otherwise, polystyrene standards were employed and tetrahydrofuran was used as the liquid phase.

"Tg" (glass transition temperature) measured in ° C. determined by DSC (Differential Scanning Calorimetry).

"(Meth)acrylate" means acrylate and methacrylate.

"Polymer solids" or "composition solids" means a polymer or composition in its dry state.

"Ambient cure condition" is defined as the temperature range of 12° C. to 45° C. (55° F. to 110° F.) and a humidity range of 15% to 90% that is present in the spraying area.

Acetoacetylated Polyvinyl Polymer

Polyvinyl polymer suitable for producing the acetoacetylated polyvinyl polymers of the present invention is represented by the following formula (I):

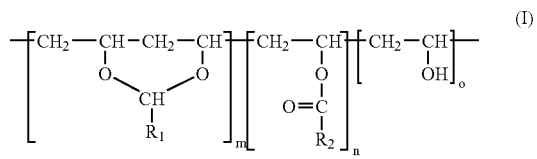

wherein (m) ranges from about 1.5 mole percent to about 85 mole percent, preferably from about 36 mole percent to about 68 mole percent, and more preferably from about 40 mole percent to about 64 mole percent, (n) ranges from about 0 mole percent to about 20.5 mole percent, preferably from about 1 mole percent to about 6 mole percent, and more preferably from about 2 mole percent to about 4 mole percent and (o) ranges from about 13 mole percent to about 98.5 mole percent, preferably from about 32 mole percent to about 63 mole percent, and more preferably from about 34 mole percent to about 55 mole percent. All the foregoing mole percentages are based on the sum of (m), (n) and (o) being 100. It should be noted that the aforementioned groups, (m), (n) and (o) are typically randomly distributed on the polymer backbone. $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, said substituents being independently selected from the group consisting of $C_1$ to $C_{12}$ alkoxy, acyl, carboxyl, derivative of carboxyl, sulfonyl, derivative of sulfonyl, cyano, and halo. Some of the examples of the foregoing for $R_1$ include propyl, phenyl and alkyl-substituted phenyl (preferably tolyl and xylyl). Some of the examples of the foregoing for $R_2$ include methyl, ethyl, propyl, butyl and phenyl. More preferred is polyvinyl butyral having $R_1$ as propyl and $R_2$ as methyl.

More preferred polyvinyl polymers having $R_1$ as propyl and $R_2$ as methyl are typically supplied in the form of fine grained free flowing powder by Clariant Corporation, Charlotte, N.C. under the trademark Mowital®. Some examples of polyvinyl butyrals suitable for use in the present invention include Mowital® B20H [(m) at 49 to 55 mole percent, (n) at 1 to 5 mole percent and (o) at 40 to 46 mole percent], B30T [(m) at 41 to 46 mole percent, (n) at 1 to 5 mole percent and (o) at 49 to 55 mole percent] and B30H [(m) at 50 to 55 mole percent, (n) at 1 to 5 mole percent and (o) at 40 to 46 mole percent].

The polyvinyl polymers suitable for use in the present invention can include copolymers of vinyl acetates with one or more of the following comonomers:

Monocarboxylic acids, such as acrylic, methacrylic, crotonic acids, preferably acrylic, methacrylic acids;

Ethylenically unsaturated dicarboxylic acids, such as maleic, fumaric, itaconic acids, preferably maleic acid;

Anhydride monomers such as, maleic anhydride;

Glycidyl-containing monomers, such as allylglycidyl ether, glycidyl (meth)acrylate, preferably glycidyl(meth) acrylate;

Halogen-containing monomers, such as vinyl chloride, vinyl fluoride and vinyl bromide, preferably vinyl chloride;

$C_2$ to $C_{12}$ alkylenes, preferably ethylene and propylene; and

Phosphate derivatives, preferably vinyl phosphate, and vinyl diphosphate.

The aforedescribed polymers, containing both vinyl acetate and one or more of the aforedescribed comonomers, are conventionally prepared by the hydrolysis of the vinyl acetate groups to vinyl alcohol groups followed by reaction, in the presence of acid catalyst, such as phosphoric acid or hydrochloric acid, with one or more aldehydes, such as acetaldehyde, propanaldehyde, butyraldehyde, or a combination thereof to produce the polyvinyl polymer of the following formula (II):

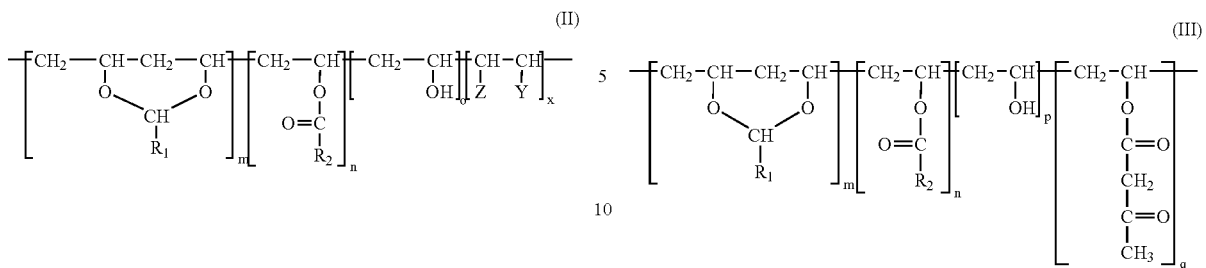

wherein $R_1$, $R_2$ (m), (n) and (o) are the same as those stated in the formula (I) above and wherein Z is H, or —COOH and Y is —COOH, halo, unsubstituted phenyl or a combination thereof and (x) ranges from about 0.5 to about 6 mole percent, preferably from about 1 mole percent to about 5 mole percent, more preferably from about 2 mole percent to about 4 mole percent, sum of (m), (n), (o) and (x) being 100.

By adjusting the proportions of (m) groups, (n) groups and hydroxyl (o) groups on the backbone of polyvinyl polymer of foregoing formulas (I), (II), or a combination thereof, the physical and chemical properties of the resulting polyvinyl polymer can be controlled. The degree of polymerization can also influence the thermal and mechanical properties of the resulting polyvinyl polymer. Thus, properties of a coating, such as, hardness, toughness, elasticity and water resistance of a resulting coating composition can be suitably adjusted.

The applicants of the present invention have unexpectedly discovered that by providing polyvinyl polymer with acetoacetate functionalities, a composition containing the resulting acetoacetylated polyvinyl polymer not only has desired substrate adhesion, but it also has lower solution viscosity. As a result, the VOC of the resulting composition can be lowered without adversely affecting coating properties.

The acetoacetylated polyvinyl polymer of the present invention results from the substitution of about 10 mole percent to about 90 mole percent, preferably of about 15 mole percent to about 55 mole percent, more preferably of about 25 mole percent to about 50 mole percent of hydroxy ethylenyl (o) groups on the polyvinyl polymer backbone of the formula (I) with acetoacetate groups. The resulting acetoacetylated polyvinyl polymer of the present invention has the following formula (III):

wherein (p) ranges from about 12 mole percent to about 87 mole percent, preferably from about 5 mole percent to about 45 mole percent and more preferably from about 7 mole percent to about 35 mole percent; and (q) ranges from about 1 mole percent to about 88 mole percent, preferably from about 5 mole percent to about 40 mole percent and more preferably from about 10 mole percent to about 30 mole percent. All the foregoing mole percentages are based on the sum of (m), (n), (p) and (q) being 100.

Alternatively, the acetoacetylated polyvinyl polymer of the present invention can also result from the substitution of about 10 mole percent to about 90 mole percent, preferably of about 15 mole percent to about 55 mole percent, more preferably of about 25 mole percent to about 50 mole percent of hydroxy ethylenyl groups (o) on the polyvinyl polymer backbone of the formula (II) with acetoacetate groups. The resulting acetoacetylated polyvinyl polymer of the present invention has the following formula (IV):

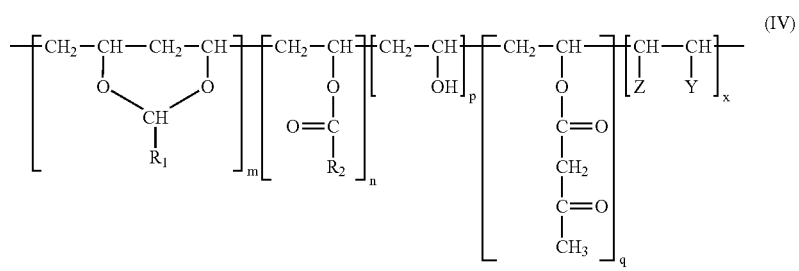

wherein all the functionalities and mole percentages of the acetoacetylated polyvinyl of formula (IV) are those described in formulas, (I), (II), and (III) above. It is understood that a combination of the acetoacetylated polyvinyl polymers of formulas (III) and (IV) can also be utilized.

The GPC weight average molecular weight of the acetoacetylated polyvinyl polymer of formulas (III) and (IV) ranges from about 10,000 to about 300,000, preferably from about 20,000 to about 200,000, more preferably from about 30,000 to about 120,000. The Tg of the acetoacetylated polyvinyl polymer ranges from about 0° C. to about 150° C., preferably from about 20° C. to about 90° C., more preferably from about 40° C. to about 60° C. as determined by DSC.

The acetoacetylated polyvinyl polymers of formulas (III) and (IV) are produced by contacting the aforedescribed polyvinyl polymer of formulas (I) or (II) with $C_1$ to $C_{12}$ alkyl acetoacetate, preferably t-butyl acetoacetate, to convert about 10 mole percent to about 90 mole percent of hydroxyl on said polyvinyl polymer into acetoacetate groups. The foregoing contacting step preferably takes place at a temperature ranging from about 75° C. to about 135° C., preferably from about 80° C. to about 125° C. and more preferably from about 90° C. to about 120° C. It should be understood that one of ordinary skill in the art could conduct the foregoing reaction at elevated or preferably at atmospheric pressure. Depending upon the reaction temperature, the reaction time can range from 2 minutes to 15 hours. The suitable process is a solution process in which polyvinyl polymer is first dissolved in a solvent, such as butyl acetate, n-methyl pyrolidone, methyl ethyl ketone, methyl propyl ketone, methyl amyl ketone; or a combination thereof followed by contacting the polyvinyl polymer solution with $C_1$ to $C_{12}$ alkyl acetoacetate. The resulting acetoacetylated polyvinyl polymer can be separated into a free flowing powder or stored as a solution in the solvent described above.

A clear extruded film of the acetoacetylated polyvinyl polymer can be laminated to glass panels, such as those used in automotive windshields, to produce shatter-resistant safety glass.

Composition

The composition of the present invention includes the acetoacetylated polyvinyl polymer of the present invention solubilized in the solvent described earlier. The acetoacetylated polyvinyl polymer can also be provided in the form of a dried powder. The amount of the acetoacetylated polyvinyl polymer utilized in the present invention typically ranges from about 3 weight percent to about 100 weight percent, preferably from about 35 weight percent to about 70 weight percent, more preferably from about 40 weight percent to about 45 weight percent, all weight percentages based on the total weight of composition solids.

The composition can further contain from about 0.1% to 50% by weight, based on the total weight of composition solids, of an acrylic polymer having a GPC weight average molecular weight of about 1,000 to 35,000.

The acrylic polymers are prepared from one or more monomers in the following group, such as, for example, acrylic ester monomer including methyl acrylate, ethyl acrylate, butyl acrylate, 2-ethylhexyl acrylate, decyl acrylate, methyl methacrylate, ethyl methacrylate, butyl methacrylate, lauryl(meth)acrylate, isobornyl(meth)acrylate, isodecyl (meth)acrylate, oleyl(meth)acrylate, palmityl(meth)acrylate, stearyl(meth)acrylate, hydroxyethyl(meth)acrylate, acetoacetoxy ethyl(meth)acrylate, and hydroxypropyl(meth)acrylate; acrylamide or substituted acrylamides; styrene or alkyl substituted styrenes; butadiene; ethylene; vinyl acetate; vinyl ester of "Versatic" acid (a tertiary monocarboxylic acid having $C_9$, $C_{10}$ and $C_{11}$ chain length, the vinyl ester is also known as "vinyl versataten), or other vinyl esters; vinyl monomers, such as, for example, vinyl chloride, vinylidene chloride, vinyl pyridine, N-vinyl pyrrolidone; amino monomers, such as, for example, N,N'-dimethylamino (meth) acrylate; chloroprene and acrylonitrile or methacrylonitrile. Acrylic acid, methacrylic acid, crotonic acid, itaconic acid, fumaric acid, maleic acid, monometlyl itaconate, monomethyl fumarate, monobutyl fumarate, maleic anhydride, 2-acrylamido-2-methyl-1-propanesulfonic acid, sodium vinyl sulfonate, and phosphoethyl methacrylate.

The composition of the present invention can also contain from about 0.01% to 40% by weight, based on the total weight of composition solids, of a polyester polymer which is the esterification product of an aliphatic or aromatic dicarboxylic acid, a polyol having at least three reactive hydroxyl groups, a diol, an aromatic or aliphatic cyclic anhydride and a cyclic alcohol. One preferred polyester is the esterification product of adipic acid, trimethylol propane, hexanediol, hexahydrophathalic anhydride and cyclohexane dimethylol.

The composition can optionally contain, in the range of from 0.1 weight percent to 50 weight percent of a modifying resin, such as a well-known non-aqueous dispersion (NAD), all percentages being based on the total weight of composition solids.

The non-aqueous dispersion-type polymer is prepared by dispersion polymerizing at least one vinyl monomer in the presence of a polymer dispersion stabilizer and an organic solvent. The polymer dispersion stabilizer may be any of the known stabilizers used commonly in the field of non-aqueous dispersions.

If desired, the composition can include in the range of from 2 weight percent to 10 weight percent, preferably in the range of 3 weight percent to 8 weight percent, more preferably 3.5 weight percent to 6 weight percent of zinc tetroxychromate, wherein all weight ranges are based on the weight of the composition. Zinc tetroxychromate supplied by Rockwood Chemicals, Beltsville, Md., under the trademark J-1345 Basic zinc chromate, can be used in the present invention.

If desired, the coating composition can include in the range of from 0.1% to 6%, preferably in the range of from 0.5% to 4.0% and more preferably 0.8 to 3 wt % of phosphoric acid, all weight percentage are by weight based on the weight of the coating composition. When used, phosphoric acid is kept separate from the composition and it is mixed with the composition just prior to use. Phosphoric acid supplied by Rhodia, Cranbury, N.J., under the name Phosphoric Acid NF 85%, can be used in the present invention.

The composition of the present invention can also contain conventional additives, such as pigments, stabilizers, rheology control agents, flow agents, toughening agents and fillers. Selection of such additional additives will, obviously, depend on the intended use of the coating composition.

In use, a layer of the composition is typically applied over a substrate by conventional techniques, such as spraying, electrostatic spraying, roller coating, dipping or brushing. The layer of the composition then dries under ambient conditions in the range of 10 minutes to 4 hours, preferably in the range of 30 minutes to 60 minutes to form a coating on the substrate having the desired coating properties. It is understood that the actual drying time depends upon the thickness of the applied layer or the presence or absence of suitable drying devices, such as fans that assist in continuously flowing air over the coated substrate to accelerate the dry rate. Generally, the composition applied as a wash primer layer having a thickness in the range of from 6 micrometers to 25 micrometers over a metal substrate, such as automotive body, dries in 10 to 60 minutes under ambient conditions in the absence of any suitable drying devices and generally, a primer layer having a thickness in the range of from 25 micrometers to 300 micrometers applied over a metal substrate, such as automotive body, dries in 2 hours to 4 hours under ambient conditions in the absence of any suitable drying devices. If desired, baking the coated substrate at a temperature of about 60° C. for about 30 minutes may further accelerate the dry rate. The foregoing baking step is particularly useful under OEM (Original Equipment Manufacture) conditions.

It is also contemplated that the composition can be conventionally produced in the form of a free flowing powder, which can be conventionally applied over a substrate through a fluidized bed. Alternatively, aqueous slurry of the powder can be utilized, which can then be conventionally applied over a substrate. An applied layer of the powder can then be typically subjected to elevated temperatures to melt the powder and form a coating on the substrate.

The present invention is also directed to a method of producing a multi-coat system, preferably multi-coat automotive OEM or refinish systems that includes the coating composition of the present invention as a wash primer. In such a method, a layer of the composition of the present invention is applied over a bare metal substrate to produce a wash primer coating by using the steps described earlier. The wash primer coating is then followed by the conventional application of a coating of a conventional base coating composition, which can be pigmented, followed by the conventional application of a coating of a conventional clear coating composition. If desired, an additional coating from a conventional primer coating composition can be applied over the wash primer coating before the application of the layer of the base coating composition.

The composition of the present invention is suitable for use as coating compositions, especially in wash primers or primers, for automotive OEM and refinish industries; industrial coatings, such as coiled coatings; flow agent in powder coatings; paper lacquers, plastic surface finishes; spot-weldable paints; strippable packaging lacquers; wood sealing varnishes; zinc-rich primers; flexographic inks; gravure inks; inkjet inks; thermo-transfer inks; temporary binders for abrasives, ceramics, metal powder pellets; rheology agents in adhesives and hot-melt adhesives; binders for sand papers; candle coatings; impregnating agent for card packaging material, welding rods, underwater welding rods, particle boards, such as orientated strand boards; coating compositions for magnetic recording tapes; adhesives for laminated printed circuit boards; safety helmets for work and sports; shatter-resistant safety glass; binders for extruded, stamped, or molded floor panels and insulating boards; as thermoset and thermoplastic injection molded compounds suitable for making consumer products; and in industrial coatings, such as coil coatings, adhesives and sealants.

The composition of the present invention is also suitable for use as coating compositions on:

Woven or non-woven cellulosic or non-cellulosic fabrics; leather or non-leather goods, such as shoes, boots, sandals, sneakers, gloves, hats and upholstery; various sports and athletics related footwear, such as sneakers, running shoes, roller blade shoes; foot ball shoes; sports and recreation equipment, such as golf clubs, balls, tees, skis, jet skis, wet bikes, snowmobiles, skates, hockey rink surfaces, hockey pucks and hockey sticks, bowling alley lanes, bowling pins and balls; fake fruits and dry flowers; fiber optics; packaging materials, such as bottles, beverage cases, food bags and boxes; finger nails and fake finger nails; safety glass, shatterproof glass and eye wear glasses; plasticizer migration resistant coating over vinyl surfaces; furniture, including lawn furniture; roof and roof tiles; textured and soft-feel wall coverings; toys, such as Nerf®balls; light fixtures and bulbs; communications equipment, such as phones, pagers and fax machines; credit cards; luggage and attaches; touch screen television tubes, cathode ray tubes and radar screens, liquid crystal and flat panel displays; mirrors; non-skid floorings; sound absorbent acoustical walls, ceilings and seats, acoustical equipment; marine surfaces, such as boat hulls, buoys, jetties, ship decks, sail canvas; office equipment, such as computers, photocopying machines, computer printers; musical instruments, such as piano, guitars, organs; costume jewelry; and bright metallic surfaces.

Due to their durable nature, the coating from the composition of the present invention may be used as durable long life traffic markings on road surfaces, including reflective road markings.

Due to improved chip and impact resistance offered by the acetoacetylated polyvinyl polymer of the present invention, woven mats or fibrous mats of the high strength materials, such as floc, pulp, fibrids, micropulp, and a combination thereof described below, can be impregnated with the coating composition of the present invention and then conventionally compression molded, extruded or pultrusion molded to produce a variety of products, such as light weight ladders, and crash resistant safety helmets, such as those described in U.S. Pat. Nos. 2,413,823; 3,946,441; and 4,466,138, all of which are incorporated herein by reference.

Floc comprises generally short fibers made by cutting continuous filament fibers into short lengths without significant fibrillation; and the lengths of short fibers can be of almost any length, but typically they vary from about 1 mm to 12 mm for a reinforcing fiber and up to several centimeters for a staple fiber that is spun into a yarn, such as 1.5 mm Keviar® 6F561 Floc supplied by DuPont Company of Wilmington, Del. Short fibers suitable for use in the present invention are the reinforcing fibers disclosed in U.S. Pat. No. 5,474,842, which is incorporated herein by reference.

Pulp can be made by refining fibers to fibrillate the short pieces of the fiber material. Pulp can be also made by casting a polymerizing solution of polymer material and grinding and refining the solution, once solidified. Such a process is disclosed in U.S. Pat. No. 5,028,372. Pulp particles differ from short fibers by having a multitude of fibrils or tentacles extending from the body of each pulp particle such as Kevlar® 1F361 supplied by DuPont Company of Wilmington, Del. These fibrils or tentacles provide minute hair-like anchors for reinforcing composite materials and cause the pulp to have a very high surface area.

Fibrids are substantially sheet-like structures, which can be made in accordance with the process disclosed in U.S. Pat. Nos. 5,209,877; 5,026,456; 3,018,091; and 2,999,788, which are all incorporated herein by reference. The process includes adding a solution of organic polymer, with vigorous agitation, to a liquid, which is a non-solvent for the polymer and is miscible with the solvent of the solution, to cause coagulation of fibrids; the coagulated fibrids are wet milled and separated from the liquid; the separated fibrids are dried, by means appropriate, to yield clumps of fibrids having a high surface area; and the clumps are opened to yield a particulate fibrid product. The Product Information brochure identified as H-67192 10/98 published DuPont Canada Inc. in Mississauga, Ontario, Canada illustrates the film like physical structure of typical fibrids known as F20W DuPont fibrids.

Micropulp having a volume average length ranging from 0.01 micrometers to 100 micrometers, preferably ranging from 1 micrometer to 50 micrometers and more preferably from ranging from 0.1 micrometers to 10 micrometers are also suitable for use in the present invention.

The aforementioned floc, fibrid, pulp or micropulp suitable for use in the present invention can be made from organic fibers from aliphatic polyamides, polyesters, polyacrylonitriles, polyvinyl alcohols, polyolefins, polyvinyl chlorides, polyvinylidene chlorides, polyurethanes, polyfluorocarbons, phenolics, polybenzimidazoles, polyphenylenetriazoles, polyphenylene sulfides, polyoxadiazoles, polyimides, aromatic polyamides, or a mixture thereof. More preferred polymers are made from aromatic polyamides, polybenzoxadiazole, polyben-zimidazole, or a mixture thereof. Still more preferred organic fibers are aromatic polyamides ((p-phenylene terephthalamide), poly(m-phenylene isophthalamide), or a mixture thereof).

More particularly, the aromatic polyamide organic fibers disclosed in U.S. Pat. Nos. 3,869,430; 3,869,429; 3,767,756; and 2,999,788, all of which are incorporated herein by reference, are preferred. Such aromatic polyamide organic fibers and various forms of these fibers are available from DuPont Company, Wilmington, Del. under the trademark Kevlar® fibers, such as Kevlar® Aramid Pulp, 1F543, 1.5 mm Kevlar® Aramid Floc 6F561, DuPont Nomex® aramid Fibrids F25W. Other suitable commercial polymer fibers include:

Zylon® PBO-AS (Poly(p-phenylene-2,6-benzobisoxazole) fiber, Zylon® PBO-HM (Poly(p-phenylene-2,6-benzobisoxazole)) fiber, Dyneema® SK60 and SK71 ultra high strength polyethylene fiber, all supplied by Toyobo, Japan. Celanese Vectran® HS pulp, EFT 1063-178, supplied by Engineering Fibers Technology, Shelton, Conn. CFF Fibrillated Acrylic Fiber supplied by Sterling Fibers Inc, Pace, Fla. Tiara Aramid KY-400S Pulp supplied by Daicel Chemical Industries, Ltd, 1 Teppo-Cho, Sakai City Japan.

The organic fibers suitable for use in the present invention can also include natural fibers, such as cellulose, cotton and wool fibers.

EXAMPLES

The following test procedures were used for generating data reported in the examples below.

Solids Measurement

The non-volatile content of polymer solutions was measured by removing the solvent of a polymer sample in down draft oven at 110° C. A known quantity of the polymer was mixed with tricresyl phosphate and acetone, and placed in a down draft oven maintained at 110±10° C. for one hour. The weight of the residue was used to calculate the wt % solids.

$^{13}$C NMR (Mole Percentage Determination)

The mole percentages of groups on the acetoacetylated polyvinyl polymer samples were determined through a Bruker DRX-400 NMR spectrometer equipped with a 10 mm broad banded probe. The polymer samples were vacuum dried at 50° C., dissolved in deuterated methanol at approximately 5–10 weight percent and run through the spectrometer at about 34° C. using a 30 second relaxation delay and a 90° flip pulse to insure quantitation.

From the ratio of the acetoacetate carbonyl to the carbon in the butyral ring between the oxygen atoms, and knowing the molar ratio of vinyl alcohol to butyral in the polymer backbone, the mole percentages of vinyl alcohol that was substituted by acetoacetate group was calculated.

Adhesion Test

The coated panels were tested for dry, wet and recovered adhesion. For dry adhesion a cross cut and a grid hatch were made on the panel, tape was applied and removed. The panel was then given two ratings. The first rating was from a visual scale of 0 to 10 based on the amount of coating removed, 0 being total failure and 10 being no coating removed. The second rating was the point-of-failure that occurred as describer above. The panels were then placed in a humidity cabinet maintained in compliance with ASTM D-1735-02 for 96 hours. The panels were removed from the humidity cabinet and the wet adhesion was measured within one hour. The panels were then stored at 25° C. and 50% relative humidity for 24 hours and then retested to measure the recovered adhesion.

Example 1

To a glass reactor equipped with an agitator, condenser, and under nitrogen atmosphere, 500 parts of Pioloform® LL4150 (GPC weight average molecular weight about 35,000) polyvinyl butyral supplied by Wacker GmbH, Munich, Germany were added to 611 parts of methyl ethyl ketone. The solution was heated to 75° C. and 80.8 parts of t-butyl acetoacetate were added over a period of several minutes. The batch was held 3 hours at 75° C. and then cooled to produce acetoacetylated polyvinyl butyral of formula (III) above wherein (p) was 28 and (q) was 8. The polymer was isolated by precipitation into cold water, (0.473 liter (1 pint) of water to 150 g of polymer solution), filtered, washed with cold water, filtered, and dried at room temperature under vacuum at room temperature for about 7 hours, and then under vacuum at about 55° C. for about 7 hours.

Example 2

To a glass reactor equipped with an agitator, condenser, and under nitrogen atmosphere, 500 parts of Pioloform® LL4150 (GPC weight average molecular weight about 35,000) polyvinyl butyral supplied by Wacker Polymer System were added to 611 parts of methyl ethyl ketone. The solution was heated to 75° C. and 255.9 parts of t-butyl acetoacetate were added over a period of several minutes. The batch was held for 3 hours at 75° C. and then cooled to produce acetoacetylated polyvinyl butyral wherein (p) was 14 and (q) was 22. The polymer was isolated by precipitation into cold water, (0.473 liter (1 pint) of water to 150 g of polymer solution), filtered, washed twice with cold water, filtered, and dried at room temperature under vacuum at room temperature for about 7 hours, and then under vacuum at about 55° C. for about 7 hours.

Example 3

To a glass reactor equipped with an agitator, condenser, distillation head, and under nitrogen atmosphere, 500 parts of Pioloform® LL4150 (GPC weight average molecular weight about 35,000) polyvinyl butyral supplied by Wacker GmbH, Munich, Germany were added to 611 parts of n-methylpyrrolidone. The solution was heated to 130° C. and 255.9 parts of t-butyl acetoacetate were added over a period of several minutes. The batch was held 3 hours at 130° C. and then cooled to produce acetoacetylated polyvinyl butyral of formula (III) above wherein (p) was 9 and (q) was 27. The polymer was isolated by precipitation in cold water, (0.473 liter (1 pint) of water to 150 g of polymer solution), filtered, washed with cold water, filtered, and dried at room temperature under vacuum at room temperature for about 7 hours, and then under vacuum at about 55° C. for about 7 hours. Final sample weight percent solids was 98.2%.

Example 4

To a glass reactor equipped with an agitator, condenser, distillation head, and under nitrogen atmosphere, 150 parts of Mowital® B20H (GPC weight average molecular weight of about 35,000 to 45,000) polyvinyl butyral supplied by Clariant Corporation were added to 606 parts of n-methylpyrolidone. The solution was heated to 190° C. to remove any low boiling solvent. The solution was then cooled to between 140° C. and 145° C. and 25.6 parts of t-butyl acetoacetate were added over a period of several minutes. The batch was held 30 minutes at temperature and then was heated to about 195° C. to remove t-butanol by-product to produce acetoacetylated polyvinyl butyral of formula (III) above wherein (p) is 39 and (q) is 4. The polymer was isolated by precipitation into cold water, (0.473 liter (1 pint) of water to 150 g of polymer solution), filtered, and dried under vacuum at 45° C.

Example 5

To a glass reactor equipped with an agitator, condenser, distillation head, and under nitrogen atmosphere, 200 parts of Mowital® B20H (GPC weight average molecular weight of about 35,000 to 45,000) polyvinyl butyral supplied by Clariant Corporation were added to 606 parts of n-methylpyrolidone. The solution was heated to 190° C. to remove any low boiling solvent. The solution was then cooled to between 140° C. and 145° C. and 68.2 parts of t-butyl acetoacetate were added over a period of several minutes. The batch was held 30 minutes at temperature and then was heated to about 195° C. to remove t-butanol by-product to produce acetoacetylated polyvinyl butyral of formula (III) above wherein (p) is 32 and (q) is 11. The polymer was isolated by precipitation into cold water, (0.473 liter (1 pint) of water to 150 g of polymer solution), filtered, and dried under vacuum at 45° C.

Example 6

To a glass reactor equipped with an agitator, condenser, distillation head, and under nitrogen atmosphere, 200 parts of Mowital® B20H (GPC weight average molecular weight of about 35,000 to 45,000) polyvinyl butyral supplied by Clariant Corporation were added to 606 parts of n-methylpyrolidone. The solution was heated to 190° C. to remove any low boiling solvent. The solution was then cooled to between 140° C. and 145° C. and 102.3 parts of t-butyl acetoacetate were added over a period of several minutes. The batch was held 30 minutes at temperature and then was heated to about 195° C. to remove t-butanol by-product to produce acetoacetylated polyvinyl butyral of formula (III) above wherein (p) is 16 and (q) is 27. The polymer was isolated by precipitation into cold water, (0.473 liter (1 pint) of water to 150 g of polymer solution), filtered, and dried under vacuum at 60° C.

Example 7

To a glass reactor equipped with an agitator, condenser, distillation head, and under nitrogen atmosphere, 300 parts of Butvar® B90 (GPC weight average molecular weight about 90,000) polyvinyl butyral supplied by Solutia Inc., Springfield, Mass. were added to 2000 parts of n-methylpyrolidone. The solution was heated to 190° C. to remove any low boiling solvent. The solution was then cooled to between 140° C. and 145° C. and 102.3 parts of t-butyl acetoacetate were added over a period of several minutes. The batch was held 30 minutes at temperature and then was heated to about 195° C. to remove t-butanol by-product and to produce acetoacetylated polyvinyl butyral of formula (III) above wherein (p) is 35 and (q) is 8. The polymer was isolated by precipitation into cold water, (0.473 liter (1 pint) of water to 150 g of polymer solution), filtered, and dried under vacuum at 45° C.

Example 8

To a glass reactor equipped with an agitator, condenser, distillation head, and under nitrogen atmosphere, 150 parts of Butvar® B90 (GPC weight average molecular weight about 90,000) polyvinyl butyral supplied by Solutia Inc., Springfield, Mass. were added to 1000 parts of n-methyl pyrolidone. The solution was heated to 190° C. to remove any low boiling solvent. The solution was then cooled to between 140° C. and 145° C. and 76.8 parts of t-butyl acetoacetate were added over a period of several minutes. The batch was held 30 minutes at temperature and then was heated to about 195° C. to remove t-butanol by-product and to produce acetoacetylated polyvinyl butyral of formula (III) above wherein (p) is 29 and (q) is 14. The polymer was isolated by precipitation into cold water, (0.473 liter (1 pint) of water to 150 g of polymer solution), filtered, and dried under vacuum at 45° C.

Coating Compositions

The examples, shown in Table 1 below, were prepared by sequentially adding the components in Table 1, to compare the coating properties of unmodified polyvinyl polymer against the acetoacetylated polyvinyl polymer of the present invention. All the compositions below were adjusted to 30 weight percent solids.

TABLE 1

|  | Comp. Ctng Ex. 1 | Ctng Ex. 1 | Ctng Ex. 2 | Ctng Ex. 3 |
| --- | --- | --- | --- | --- |
| Poly Vinyl Butyral[1] | 30.0 | | | |
| Example 1 | | 30.0 | | |
| Example 2 | | | 30.0 | |
| Example 3 | | | | 30.6 |
| ethanol | 39.9 | 39.9 | 39.9 | 39.6 |
| toluene | 30.1 | 30.1 | 30.1 | 29.9 |
| Total | 100 | 100 | 100 | 100 |

[1]Pioloform ® LL4150 polyvinyl butyral supplied by Wacker Polymer System.

The layers of coating compositions described in Table 1 above were applied with a draw-down bar over electro-coated steel test panels to a dry film thickness of 1.5 to 2 mils (38 to 50 micrometers). The layers were then dried for at least 14 days and then adhesion was tested to the indicated substrates.

TABLE 2

| | Under Dry Conditions | | Under Wet Conditions | | After Recovery | |
|---|---|---|---|---|---|---|
| | # Hatch | X hatch | # Hatch | X hatch | # Hatch | X hatch |
| Adhesion over unsanded electrocoated steel substrates | | | | | | |
| Comp. Ctng Ex. 1 | 3 | 8 | 7 | 9 | 5 | 10 |
| Ctng Ex. 1 | 3 | 10 | 8 | 8 | 9 | 9 |
| Ctng Ex. 2 | 8 | 9 | 9 | 9 | 10 | 9 |

TABLE 2-continued

| | Under Dry Conditions | | Under Wet Conditions | | After Recovery | |
|---|---|---|---|---|---|---|
| | # Hatch | X hatch | # Hatch | X hatch | # Hatch | X hatch |
| Ctng Ex. 3 | 8 | 9 | 8 | 9 | 9 | 9 |
| Adhesion over galvanized steel substrates | | | | | | |
| Comp. Ctng Ex. 1 | 10 | 10 | 8 | 8 | 10 | 10 |
| Ctng Ex. 1 | 10 | 10 | 8 | 10 | 10 | 10 |
| Ctng Ex. 2 | 10 | 10 | 9 | 10 | 10 | 10 |
| Ctng Ex. 3 | 10 | 10 | 8 | 8 | 10 | 10 |
| Adhesion over cold rolled steel (CRS) substrates | | | | | | |
| Comp. Ctng Ex. 1 | 9 | 10 | 8 | 9 | 10 | 10 |
| Ctng Ex. 1 | 9 | 10 | 8 | 9 | 10 | 10 |
| Ctng Ex. 2 | 10 | 10 | 9 | 10 | 10 | 10 |
| Ctng Ex. 3 | 10 | 10 | 9 | 10 | 10 | 10 |
| Adhesion over Aluminum substrates | | | | | | |
| Comp. Ctng Ex. 1 | 10 | 10 | 10 | 10 | 10 | 10 |
| Ctng Ex. 1 | 10 | 10 | 1 | 1 | 1 | 1 |
| Ctng Ex. 2 | 10 | 10 | 1 | 7 | 1 | 2 |
| Ctng Ex. 3 | 10 | 10 | 3 | 10 | 10 | 10 |

Cold rolled steel panels coated with Powercron® 590 E-coat supplied by ACT Laboratories, Inc, Hillsdale, Illinois.

From Table 2, it can be seen that the coating compositions of the present invention can be suitably used over various types of substrates. Unmodified Polyvinyl butyral (Comp. Ctng Ex. 1) showed poor adhesion to unsanded electrocoated steel panels. The acetoacetylated polyvinyl butyral of the present invention, which contain acetoacetate groups, showed much improved adhesion to unsanded electrocoated panels. While the adhesion of these polymers to Aluminum was less than desired at low levels of acetoacetylation, it improved dramatically at higher levels of acetoacetylation (Ctng Ex. 3 vs. Ctng Ex. 1 and 2). Therefore, the acetoacetylated polyvinyl butyrals of the present invention have improved adhesion to unsanded electrocoated steel panels, without sacrificing adhesion to other substrates.

The examples, shown in Table 3 below, were prepared by sequentially adding the components in Table 3, to compare the coating properties of acetoacetylated polyvinyl butyral against the acetoacetylated polyvinyl butyral of the present invention.

TABLE 3

| | Ctg. Ex 4 | Ctg. Ex 5 | Ctg. Ex 6 | Comp. Ctg. Ex. 2 | Ctg. Ex 7 | Ctg. Ex. 8 |
|---|---|---|---|---|---|---|
| Ethanol | 37.0 | 37.0 | 37.0 | 37.0 | 37.0 | 37.0 |
| Toluene | 28.7 | 28.7 | 28.7 | 28.7 | 28.7 | 28.7 |
| Deionized water | 1.1 | 1.1 | 1.1 | 1.1 | 1.1 | 1.1 |
| Example 4 | 10 | | | | | |
| Example 5 | | 10 | | | | |
| Example 6 | | | 10 | | | |
| Comm.Poly* | | | | 10 | | |
| Example 7 | | | | | 10 | |
| Example 8 | | | | | | 10 |
| Ethanol | 22.5 | 22.5 | 22.5 | 22.5 | 22.5 | 22.5 |
| Toluene | 15 | 15 | 15 | 15 | 15 | 15 |
| Total | 114.31 | 114.31 | 114.31 | 114.31 | 114.31 | 114.31 |

*Butvar® B90 polyvinyl butyral supplied by Solutia, Inc.

The layers of coating compositions described in Table 3 above were applied with a draw-down bar over test panels indicated below to a dry film thickness of 13 to 25.4 micrometers (0.5 to 1.0 mil). The layers were then dried for at least 14 days and then adhesion was tested.

TABLE 4

| | Under Dry Conditions | | Under Wet Conditions | | After Recovery | |
|---|---|---|---|---|---|---|
| | # Hatch | X Hatch | # Hatch | X Hatch | # Hatch | X Hatch |
| Adhesion over aluminum substrates. | | | | | | |
| Ctg. Ex. 4 | 10 | 10 | 10 | 10 | 10 | 10 |
| Ctg. Ex. 5 | 10 | 10 | 10 | 10 | 10 | 10 |
| Ctg. Ex. 6 | 10 | 10 | 10 | 10 | 10 | 10 |
| Comp. Ctg. Ex 2 | 10 | 10 | 10 | 10 | 10 | 10 |
| Ctg. Ex. 7 | 10 | 10 | 10 | 10 | 10 | 10 |
| Ctg. Ex. 8 | 10 | 10 | 10 | 10 | 10 | 10 |
| Adhesion over cold rolled steel (CRS) substrates. | | | | | | |
| Ctg. Ex. 4 | 10 | 10 | 10 | 10 | 10 | 10 |
| Ctg. Ex. 5 | 10 | 10 | 10 | 10 | 10 | 10 |
| Ctg. Ex. 6 | 10 | 10 | 10 | 10 | 10 | 10 |
| Comp. Ctg. Ex 2 | 10 | 5 | 5 | 2 | 6 | 2 |
| Ctg. Ex. 7 | 10 | 10 | 10 | 7 | 10 | 10 |
| Ctg. Ex. 8 | 10 | 10 | 10 | 9 | 10 | 10 |
| Adhesion over sanded electrocoated substrates*. | | | | | | |
| Ctg. Ex. 4 | 10 | 10 | 10 | 10 | 10 | 10 |
| Ctg. Ex. 5 | 10 | 10 | 10 | 10 | 10 | 10 |
| Ctg. Ex. 6 | 10 | 10 | 10 | 10 | 10 | 10 |
| Comp. Ctg. Ex 2 | 10 | 10 | 8 | 2 | 10 | 10 |
| Ctg. Ex. 7 | 10 | 10 | 10 | 10 | 10 | 10 |
| Ctg. Ex. 8 | 10 | 10 | 10 | 10 | 10 | 10 |

TABLE 4-continued

|  | Under Dry Conditions | | Under Wet Conditions | | After Recovery | |
|---|---|---|---|---|---|---|
|  | # Hatch | X Hatch | # Hatch | X Hatch | # Hatch | X Hatch |
| Adhesion over unsanded electrocoated substrates* | | | | | | |
| Ctg. Ex. 4 | 10 | 3 | 10 | 1 | 10 | 4 |
| Ctg. Ex. 5 | 10 | 10 | 10 | 10 | 10 | 10 |
| Ctg. Ex. 6 | 10 | 10 | 10 | 10 | 10 | 10 |
| Comp. Ctg. Ex 2 | 0 | 0 | 0 | 0 | 3 | 2 |
| Ctg. Ex. 7 | 6 | 2 | 1 | 8 | 3 | 10 |
| Ctg. Ex. 8 | 10 | 2 | 10 | 10 | 10 | 10 |
| Adhesion over galvanized steel substrates | | | | | | |
| Ctg. Ex. 4 | 10 | 10 | 10 | 10 | 10 | 10 |
| Ctg. Ex. 5 | 10 | 10 | 10 | 10 | 10 | 10 |
| Ctg. Ex. 6 | 10 | 10 | 10 | 10 | 10 | 10 |
| Comp. Ctg. Ex 2 | 10 | 10 | 1 | 1 | 1 | 1 |
| Ctg. Ex. 7 | 10 | 10 | 6 | 10 | 6 | 2 |
| Ctg. Ex. 8 | 10 | 10 | 10 | 10 | 10 | 10 |

*Cold rolled steel panels coated with Powercron® 590 E-coat supplied by ACT Laboratories, Inc, Hillsdale, Illinois.

From Table 4, it can be readily seen that the presence of the acetoacetylated polyvinyl butyral of the present invention in a coating composition resulted in excellent adhesion to a variety of substrates. Performance of the acetoacetylated polyvinyl butyral of the present invention in a coating composition was particularly good on cold rolled steel (CRS) substrates, on galvanized steel substrates and on unsanded e-coated substrates, as compared to the unmodified polyvinyl butyral (Comp. Ctg. Ex. 2). The test on unsanded electrocoated substrates was very demanding, but the presence of acetoacetylated polyvinyl butyral at higher levels of acetoacetylation showed dramatically better adhesion as compared to that containing the unmodified polyvinyl butyral (Ctg. Ex. 5, 6, 8 compared to Comp. Ctg. Ex. 2) It can also be readily seen that the presence of the acetoacetylated polyvinyl butyral of the present invention in a coating composition showed no weakness in adhesion to the sanded electrocoated substrates, as compared to that containing the unmodified polyvinyl butyral. This improvement in performance is achieved without sacrificing adhesion to aluminum.

What is claimed is:

1. A method of producing a molded article comprising:
   (i) mixing fibrids, floc, pulp, micropulp or a combination thereof with a composition to form a moldable component, said composition comprising:
   (a) an acetoacetylated polyvinyl polymer having the formula:

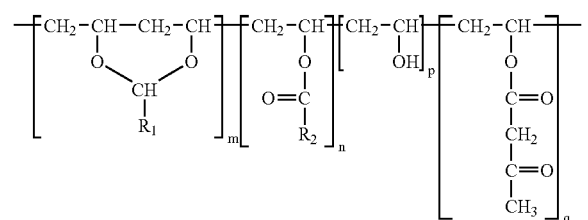

wherein (m) ranges from about 1.5 mole percent to about 85 mole percent, (n) ranges from about 0 mole percent to about 20.5 mole percent, (p) ranges from about 12 mole percent to about 87 mole percent and (q) ranges from about 1 mole percent to about 88 mole percent, sum of (m), (n), (p) and (q) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, said substituents being independently selected from the group consisting of $C_1$ to $C_{12}$ alkoxy, acyl, carboxyl, derivative of carboxyl, sulfonyl, derivative of sulfonyl, cyano, and halo;

(b) an acetoacetylated polyvinyl polymer having the formula:

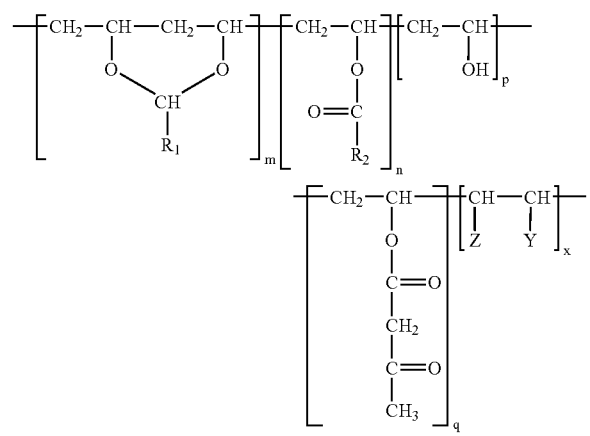

wherein (m) ranges from about 1.5 mole percent to 85 mole percent, (n) ranges from about 0 mole percent to 20.5 mole percent, (p) ranges from about 12 mole percent to about 87 mole percent, (q) ranges from about 1 mole percent to about 88 mole percent and (x) ranges from 0.5 to 6 mole percent, sum of (m), (n), (p), (q) and (x) being 100 and wherein $R_1$ and $R_2$ are independently H, substituted or unsubstituted $C_1$ to $C_{12}$ alkyl, substituted or unsubstituted $C_6$ to $C_{14}$ aryl, substituted or unsubstituted $C_7$ to $C_{22}$ aralkyl, substituted or unsubstituted $C_6$ to $C_{14}$ alkaryl, substituted, unsubstituted $C_4$ to $C_{14}$ carbocyclyl or a combination thereof, and wherein Z is H, or —COOH and Y is —COOH, halo, unsubstituted phenyl or a combination thereof; said substituents being independently selected from the group consisting of $C_1$ to $C_{12}$ alkoxy, acyl, carboxyl, derivative of carboxyl, sulfonyl, derivative of sulfonyl, cyano, and halo; or (c) a combination thereof;

(ii) heating said moldable component into a melt;
(iii) conveying a desired amount of said melt into a cavity of an article mold;
(iv) cooling said desired amount of melt to form said article; and
(v) removing said article from said cavity.

2. The method of claim 1 wherein said molded article is a safety helmet.

* * * * *